UNITED STATES PATENT OFFICE.

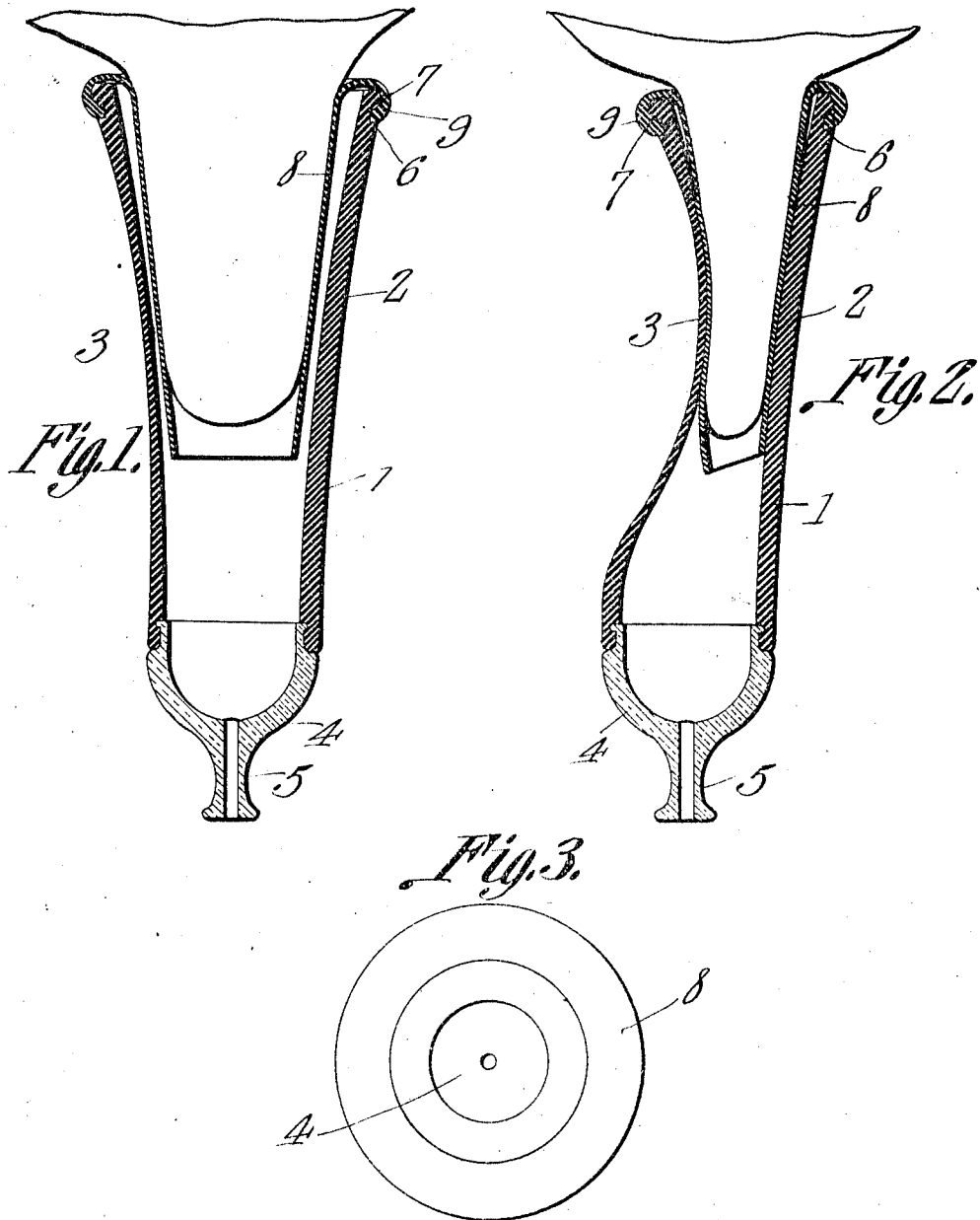

DANIEL KLEIN AND DAVID BROWN, OF SPOKANE, WASHINGTON.

TEAT-CUP.

1,004,279. Specification of Letters Patent. Patented Sept. 26, 1911.

Application filed August 16, 1910. Serial No. 577,443.

*To all whom it may concern:*

Be it known that we, DANIEL KLEIN and DAVID BROWN, citizens of the United States, residing at Spokane, in the county of Spokane, State of Washington, have invented a new and useful Teat-Cup, of which the following is a specification.

This invention has reference to improvements in teat cups designed more especially for use in milking machines of the pulsator type wherein the teat enveloped by the cup is subjected to the alternate action of a partial vacuum and the restoration of atmospheric pressure.

The present invention is an improvement upon the teat cup shown and described in application Serial No. 538,737, filed January 18, 1910, by one of us, namely Daniel Klein.

In the particular type of teat cups to which the present invention relates a portion of the wall of the cup is collapsible when sub-atmospheric pressure is established within the cup and this collapsible section progressively acts on the teat from the root end toward the tip end and closely simulates the natural action of a calf's mouth. It has been found in practice that there is a liability of congestion of the teat with such a cup and to avoid this objectionable feature the teat is directly enveloped in a thin highly flexible soft rubber envelop which protects it from the direct action of the outer walls of the cup and subatmospheric pressure within the cup. In accordance with the invention set forth in the aforesaid application the envelop is made an integral part of the teat cup and extends from the teat receiving end of the cup a sufficient distance thereinto to practically envelop the entire length of the teat. In practice it is found that such envelop or sheath will wear out or deteriorate much more rapidly than the outer or body portion of the cup and therefore the user has either to discard the cup otherwise in good condition or use a defective cup.

It is the object of the present invention to provide a means whereby the delicate inner sheath may be readily attached to and removed from the body of the cup without in any manner interfering with its use so that this more readily wearable portion of the cup may be discarded and a new sheath reinserted so that the life of the cup is much prolonged, the body portion of the cup outwearing many of the delicate inner sheaths.

The invention will be best understood from a consideration of the following description taken in connection with the accompanying drawings forming a part of this specification, in which drawings, Figure 1 is a longitudinal section of a teat cup embodying the present invention and shown in the uncollapsed position. Fig. 2 is a similar view showing the cup collapsed. Fig. 3 is a top plan view of the cup as shown in Fig. 1.

Referring to the drawings there is shown a cup 1 which may be of known construction in so far as its walls are concerned, the portion 2 of the walls being quite stiff and another portion 3 of the walls being quite flexible and elastic. The portion 3 of the walls of the cup normally retains its shape but will readily yield to atmospheric pressure when sub-atmospheric pressure is produced within the cup. The manner of producing the stiffened portion 2 of the walls and the flexible portion 3 is immaterial to the present invention and so the resisting portion 2 and the flexible portion 3 are indicated in the drawings simply by differences in thickness, this being indicative only and not mandatory as to the construction actually employed. The cup is made smaller at one end than the other and at the smaller end of the cup there is applied a funnel like member 4, preferably though not necessarily of glass and the narrow end 5 of the funnel is shaped to receive and retain a conduit leading to the usual pulsator, but this conduit and pulsator have been omitted from the drawings as unnecessary to an understanding of the present invention. The udder or teat receiving end of the cup is sufficiently expanded and provided with a circumferential groove 6 beyond which there may be formed a circumferential bead 7. The teat receiving end of the cup is provided with the sheath or envelop 8 of thin, soft, flexible rubber having its outer end curved away from the body of the sheath and then returned on itself and finally thickened and directed toward said body as shown at 9 so that this end of the sheath is adapted to override and embrace the bead 7, the terminal edge of the portion 9 seating in the groove 6. The portion 9 of the sheath may be thickened so as to be stiffer than the body portion of the sheath which latter is of such diameter and such length as to practically envelop the entire length of the teat with the roll portion 9 forming the udder engaging part of the cup, this latter feature being particularly advantageous in bringing against the udder a soft, high grade body of rubber.

Because of the flexibility of the end 9 of the sheath 8 it may be readily applied to the teat receiving end of the cup 1 or may be as readily removed therefrom while the elasticity of the roll 9 is sufficient to maintain it in proper relation to the bead 7 and the sheath may be applied to or removed from the teat without danger of disconnection with the body portion of the cup. At the same time the highly flexible sheath 8 will readily conform to the teat while the roll 9 will readily conform to the udder or the root of the teat where joining the udder. When sub-atmospheric pressure is produced within the teat cup the sheath 8 will readily yield to the collapsing of the flexible portion 3 but the inner walls of this portion 3 are not brought into engagement with the teat except through the protecting sheath 8 and the partial vacuum within the cup has no direct effect upon the walls of the teat thus preventing congestion and avoiding soreness and fever.

It will be observed that the walls of the sheath 8 are quite separate from the inner walls of the teat cup except where the roll 9 joins the sheath 8 to the cup.

The sheath 8 prevents any expansion of the outer walls of the teat under the action of sub-atmospheric pressure but the sheath is so flexible as to yield readily to the collapsing of the wall 3 under the action of atmospheric pressure when the sub-atmospheric pressure is produced within the cup and so the action of the cup is in no wise interfered with by the presence of the sheath 8.

It is to be observed that the portion 3 of the teat cup is made highly flexible so as to cause the action of the cup on the teat to closely simulate the action of the tongue of a calf on a cow's teat.

It will be understood that the extent of the flexible portion 3 of the cup does not enter into the present invention and consequently this portion of the cup may be extensive or limited as found expedient.

By making the sheath or envelop 8 readily removable, such sheaths may be readily renewed when worn or damaged without the necessity of discarding the more expensive body 1 of the cup, more especially as the body of the cup will outlast many sheaths. Furthermore the removability of the sheath 8 contributes to the cleanliness of the cup since the inner walls of the cup may be readily cleansed when the sheath is removed. Since the sheath 8 is made of very thin and soft rubber it is capable of being distended in case the teat is larger than the interior diameter of the sheath so that the teat will readily slip down until the top of the cup rests against the bottom of the udder.

What is claimed is—

A teat cup adapted to collapse progressively from the inlet end toward the discharge end under the production therein of sub-atmospheric pressure, said cup having a circumferential groove at its inlet end and a bead arranged beyond the groove, and a tapering interior sheath or sleeve of softer material than the cup and having an outwardly and then inwardly curved roll of greater thickness than the body of the sheath, said roll forming a cushion detachably engaging the grooved and beaded portion of the cup, that portion of the sheath within the cup being normally spaced from the cup, the inlet portions of the sheath and the cup coöperating to form an annular air cushion when the cup and sheath are collapsed.

In testimony that we claim the foregoing as our own, we have hereto affixed our signatures in the presence of two witnesses.

DANIEL KLEIN.
DAVID BROWN.

Witnesses:
JNO. A. GUE,
W. A. HOSTETTER.